United States Patent
Voss

(10) Patent No.: US 11,359,580 B2
(45) Date of Patent: Jun. 14, 2022

(54) DEVICE FOR INJECTING AN EMULSION INTO AN INTERNAL COMBUSTION ENGINE OF A MOTOR VEHICLE

(71) Applicant: Dr. Ing. h.c. F. Porsche Aktiengesellschaft, Stuttgart (DE)

(72) Inventor: Hartmut Voss, Wimsheim (DE)

(73) Assignee: Dr. Ing. h. c. F. Porsche AG, Stuttgart (DE)

( * ) Notice: Subject to any disclaimer, the term of this patent is extended or adjusted under 35 U.S.C. 154(b) by 0 days.

(21) Appl. No.: 16/783,305

(22) Filed: Feb. 6, 2020

(65) Prior Publication Data
US 2020/0248653 A1    Aug. 6, 2020

(30) Foreign Application Priority Data
Feb. 6, 2019 (DE) .................. 10 2019 102 900.7

(51) Int. Cl.
*F02M 25/00* (2006.01)
*F02M 25/03* (2006.01)
*F02M 25/022* (2006.01)
*B60K 15/03* (2006.01)
(Continued)

(52) U.S. Cl.
CPC ......... *F02M 25/0228* (2013.01); *B60K 15/03* (2013.01); *F02D 41/009* (2013.01); *F02D 41/3005* (2013.01); *F02M 25/0222* (2013.01); *F02M 25/0225* (2013.01); *F02D 2200/021* (2013.01)

(58) Field of Classification Search
CPC .......... F02M 25/0228; F02M 25/0227; F02M 25/03; F02M 25/0225; F02M 43/00
See application file for complete search history.

(56) References Cited

U.S. PATENT DOCUMENTS 5,125,367 A    6/1992  Ulrich et al.
5,271,370 A *  12/1993 Shimada ............... F02M 25/03
                                                    123/568.21
(Continued)

FOREIGN PATENT DOCUMENTS

DE        101 97 207           12/2012
DE      10 2014 225 815          6/2016
JP         2004300988 A  *      10/2004

OTHER PUBLICATIONS

Google translation of JP2004300988A, Kato (Year: 2004).*
Chinese Office Action dated Jun. 18, 2021.

*Primary Examiner* — Long T Tran
(74) *Attorney, Agent, or Firm* — Gerald E. Hespos; Michael J. Porco; Matthew T. Hespos

(57) ABSTRACT

A device is provided for injecting an emulsion of water and fuel into an internal combustion engine of a motor vehicle. The device includes a water tank (100) for storing water, a fuel tank (101) for storing fuel, first and second fluid lines (103), an emulsion mixer having a mixing chamber (102), first and second inlets (104), and an outlet (105). The water tank (100) is connected to the first inlet (104) via the first fluid line (103). The fuel tank (101) is connected to the second inlet (104) via the second fluid line (103). The emulsion mixer is configured to output an emulsion that comprises the fuel and the water via the outlet (105). A settable mixer is in the mixing chamber (102) and is configured to set a mixture ratio between the water and the fuel in the emulsion.

5 Claims, 4 Drawing Sheets

(51) Int. Cl.
    *F02D 41/30*     (2006.01)
    *F02D 41/00*     (2006.01)

(56) References Cited

U.S. PATENT DOCUMENTS

| | | | | |
|---|---|---|---|---|
| 5,682,842 | A * | 11/1997 | Coleman | F02D 19/12 123/25 J |
| 2004/0144339 | A1* | 7/2004 | Hattori | F02M 25/03 123/305 |
| 2004/0191708 | A1* | 9/2004 | Matoba | F23D 11/44 431/2 |
| 2005/0126513 | A1* | 6/2005 | Hendren | F02M 25/0228 123/1 A |
| 2008/0006326 | A1* | 1/2008 | Cottell | F17D 1/17 137/15.05 |
| 2009/0078232 | A1* | 3/2009 | Kramb | C10L 1/125 123/25 J |
| 2010/0263623 | A1 | 10/2010 | Sakurai et al. | |
| 2012/0060801 | A1* | 3/2012 | Ito | B01F 25/50 123/575 |
| 2012/0103306 | A1* | 5/2012 | Livshits | F02M 31/0825 123/429 |
| 2012/0222649 | A1* | 9/2012 | Kudoh | B05B 7/0491 261/76 |
| 2013/0036662 | A1* | 2/2013 | Cottell | F17D 1/17 44/639 |
| 2013/0087124 | A1* | 4/2013 | Kylstrom | F02D 19/0684 123/447 |
| 2018/0328315 | A1* | 11/2018 | Taniel | F02M 25/0228 |
| 2019/0353126 | A1* | 11/2019 | Gerundt | F02M 63/0225 |

* cited by examiner

DEVICE FOR INJECTING AN EMULSION INTO AN INTERNAL COMBUSTION ENGINE OF A MOTOR VEHICLE

CROSS REFERENCE TO RELATED APPLICATION

This application claims priority under 35 USC 119 to German Patent Appl. No. 10 2019 102 900.7 filed on Feb. 6, 2019, the entire disclosure of which is incorporated herein by reference.

BACKGROUND

Field of the Invention

The invention relates to a device for injecting an emulsion into an internal combustion engine of a motor vehicle. The internal combustion engine can be for example a diesel engine or a gasoline engine.

Related Art

Fuel emulsions made up of water and a fuel are injected into internal combustion engines to reduce the mass of the nitrogen oxides created during the combustion process, in particular in diesel engines. Emulsion injection in gasoline engines enables the cooling action of the water during high-load operation to be exploited to reduce the knocking tendency, to set a stoichiometric mixture, and to protect the exhaust-gas conducting components from excessively high temperatures.

DE 101 97 207 B4 discloses a device having an emulsion mixer, a water tank, and a fuel tank. The water tank and the fuel tank each are connected to the emulsion mixer by a fluid line via a valve. The valves set the mixture ratio between the fuel and the water outside the emulsion mixer.

By contrast, an object of the invention is to create a device that is easier to control, to provide a motor vehicle having such a device, and to provide a method for injecting an emulsion into an internal combustion engine of such a motor vehicle.

SUMMARY

The device comprises a water tank for storing water, a fuel tank for storing fuel, fluid lines, and an emulsion mixer having a mixing chamber, two or more inlets, and an outlet. In the context of this description, a mixing chamber is understood to be a space that is closed off—apart from the inlets and outlet—and in which there is no fluid exchange with an environment surrounding the mixing chamber.

The water tank is connected to a first of the inlets via one of the fluid lines. The fuel tank is connected to a second of the inlets via one of the fluid lines. In the context of this description, a fluid line is understood to be a line that is suitable for conducting fuel and/or water, such as a pipe or a hose.

The emulsion mixer is configured to output an emulsion made up of the water and the fuel via the outlet. For this purpose, the emulsion mixer has a mixing means arranged in the mixing chamber. The mixing means is configured to achieve a thorough mixing of the of the water and the fuel in the emulsion mixer. For example, mixing may be achieved by causing the fuel and the water to approach one another at an acute angle. The mixing ratio may be achieved by having the water injected in intermittent spurts or injections that may vary in frequency, for example, in accordance with the frequency of crankshaft revolutions. Thus, the frequency of the intermittent water injections and hence the volume of water injected will be a function of the speed of rotation of the crankshaft. The duration of the water injection also can be varied and controlled by the engine control unit that continuously monitors crankshaft rotation speed and other control parameters. The amount of fuel that is injected into the mixing chamber and toward the fuel/water emulsion outlet can be varied by known fuel injection protocols that typically are based at least partly on engine speed, accelerator pedal position and so forth. Thus, valves in or leading to the mixing chamber are not required to achieve the specified volume or ratio of water in the fuel/water emulsion.

Mixing the fuel and water in the mixing chamber enables a particularly compact emulsion mixer in which the mixture ratio is settable. No valves outside the mixing chamber are required to set the mixture ratio. Furthermore, the mixture ratio can be set precisely and easily. For this purpose, all that is necessary is to set the mixing means. Compared with for example two valves, the number of components to be set is thus halved.

The device may comprise a control unit that is configured to control the mixing means, for example, by controlling the number of water injections per unit of time based on the rate of rotation of the crankshaft. The control can take place for example electronically.

The emulsion mixer may be configured to mix the fuel with the water in the mixing chamber.

The inlets and the outlet may be arranged on a housing. The mixing chamber may be arranged within the housing.

The motor vehicle comprises a device according to one embodiment of the invention and an internal combustion engine that is connected to the outlet of the emulsion mixer via a third of the fluid lines.

The method comprises feeding fuel and water to the mixing chamber. A mixture ratio between the water and the fuel is set using the mixing means. The mixing means may cause one or plural water injection speeds to be directed toward a stream of fuel at an acute angle. The mixing ratio of the water and fuel in the emulsion may be controlled by measuring the rotational speed of the engine crankshaft and adjusting the frequency of water injections as a function of the crankshaft rotational speed. The mixing ratio of the water and fuel in the emulsion also can be controlled by adjusting the duration of each injection of water into the mixing chamber. The emulsion that comprises the water and the fuel in the set mixture ratio is mixed in the mixing chamber and subsequently injected into the internal combustion engine.

Further features and advantages of the present invention will become apparent from the following description of a preferred exemplary embodiment with reference to the accompanying drawing.

DETAILED DESCRIPTION

Figure 1:
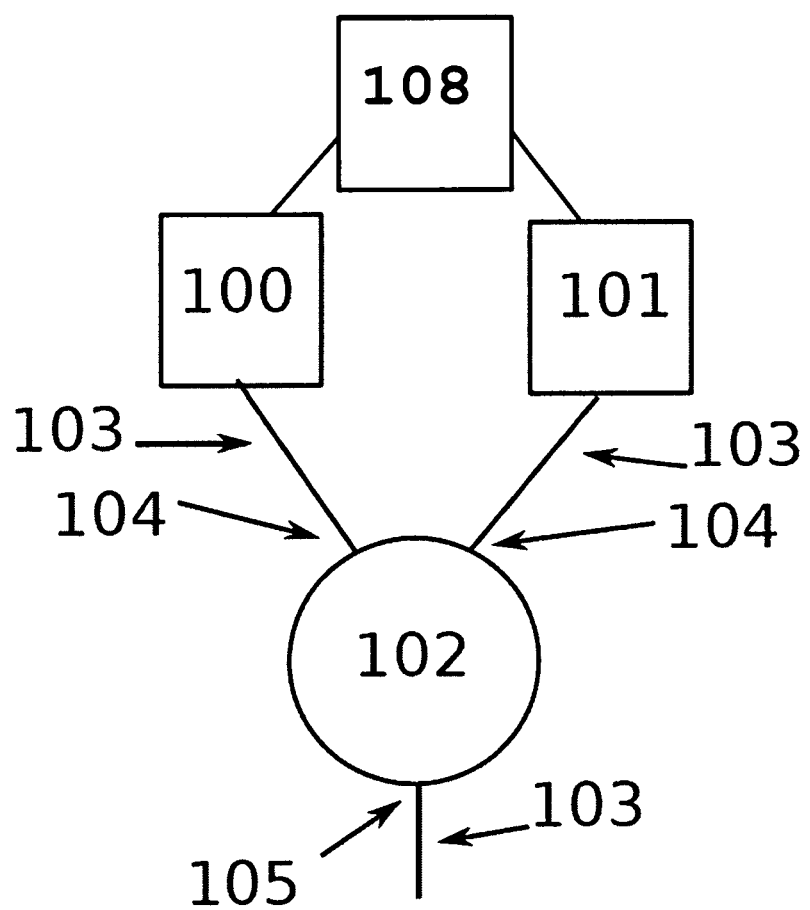
FIG. 1 shows a schematic view of a device according to one embodiment of the invention.

The device comprises a water tank 100, a fuel tank 101, an emulsion mixer having a mixing chamber 102, at least two inlets 104, and an outlet 105. The water tank 100 and the fuel tank 101 are connected to the inlets 104 via fluid lines 103. A fluid line 103, via which the emulsion can be output to an internal combustion engine, is likewise connected at the outlet 105. A mixing means is arranged in the mixing chamber 102.

In operation, water and fuel are fed to the mixing chamber 102 from the water tank 100 and the fuel tank 101 via the fluid lines 103 and the inlets 104. Using the mixing means arranged in the mixing chamber 102, the desired ratio between fuel and water is set based on certain parameters measured, for example, by an engine control unit 108. The measured parameters preferably include at least the rotational speed of the engine crankshaft as measured by the control unit 108. The emulsion that comprises the fuel and the water in the desired ratio is then output via the outlet 105 and the fluid line 103.

Figure 2:
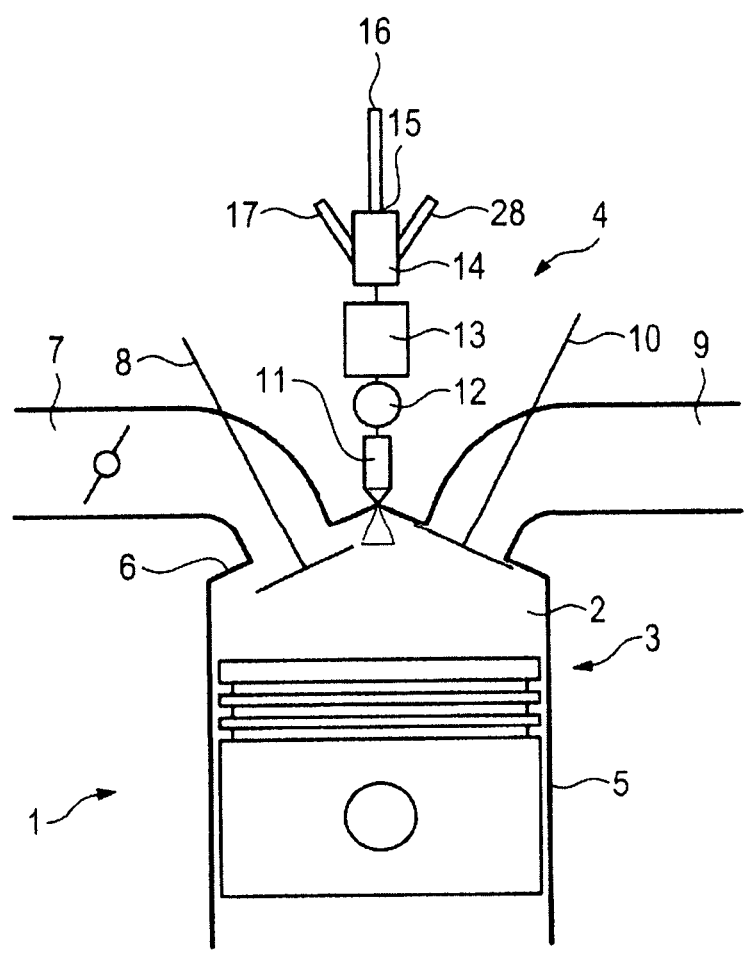
FIG. 2 is a basic illustration, a cylinder with a combustion chamber of an internal combustion engine with a fuel injection system having a mixing device according to the invention.

FIG. 2 illustrates a cylinder 1 with a combustion chamber 2 of an internal combustion engine 3 with a fuel injection system 4. The cylinder 1 is formed in a crankcase 5 of the internal combustion engine 3, and the combustion chamber 2 is formed in a cylinder head 6 of the internal combustion engine 3. At least one inlet duct 7 is connected to the cylinder head 6 in an adjoining manner and has an inlet valve 8 via which combustion air can flow into the cylinder 1 and the combustion chamber 2. The cylinder head 6 also has at least one outlet duct 9 with an outlet valve 10 via which exhaust gas formed during combustion of the combustion air with fuel or with a fuel-water emulsion is able to flow out when the outlet valve 10 is opened.

The fuel or the emulsion is injected into the combustion chamber 2 with the aid of an injector 11 of the fuel injection system 4. The injector 11 also can be referred to as an injection nozzle. The injector 11 is arranged on a high-pressure line 12 so as to be able to be flowed through by way of the latter. The high-pressure line 12 is filled with fuel, or with the emulsion, with the aid of a high-pressure pump 13 of the fuel injection system 4 that is positioned upstream of the injector 11. A mixing device 14 of the fuel injection system 4 is arranged upstream of the high-pressure pump 13 and accommodates a flow generated by the high-pressure pump 13. The mixing device 14 has a fuel connection 15 that is connected to a fuel line 16 opening into a fuel tank (not illustrated in more detail) of the internal combustion engine 3 and can accommodate a flow of fuel. A low-pressure pump (not illustrated in more detail) of the fuel injection system 4 is upstream of the mixing device 14 and delivers fuel from the fuel tank as sense for example by a position of an accelerator pedal. The mixing device 14 of this embodiment has a first coolant connection 17 and a second coolant connection 28.

Figure 3:
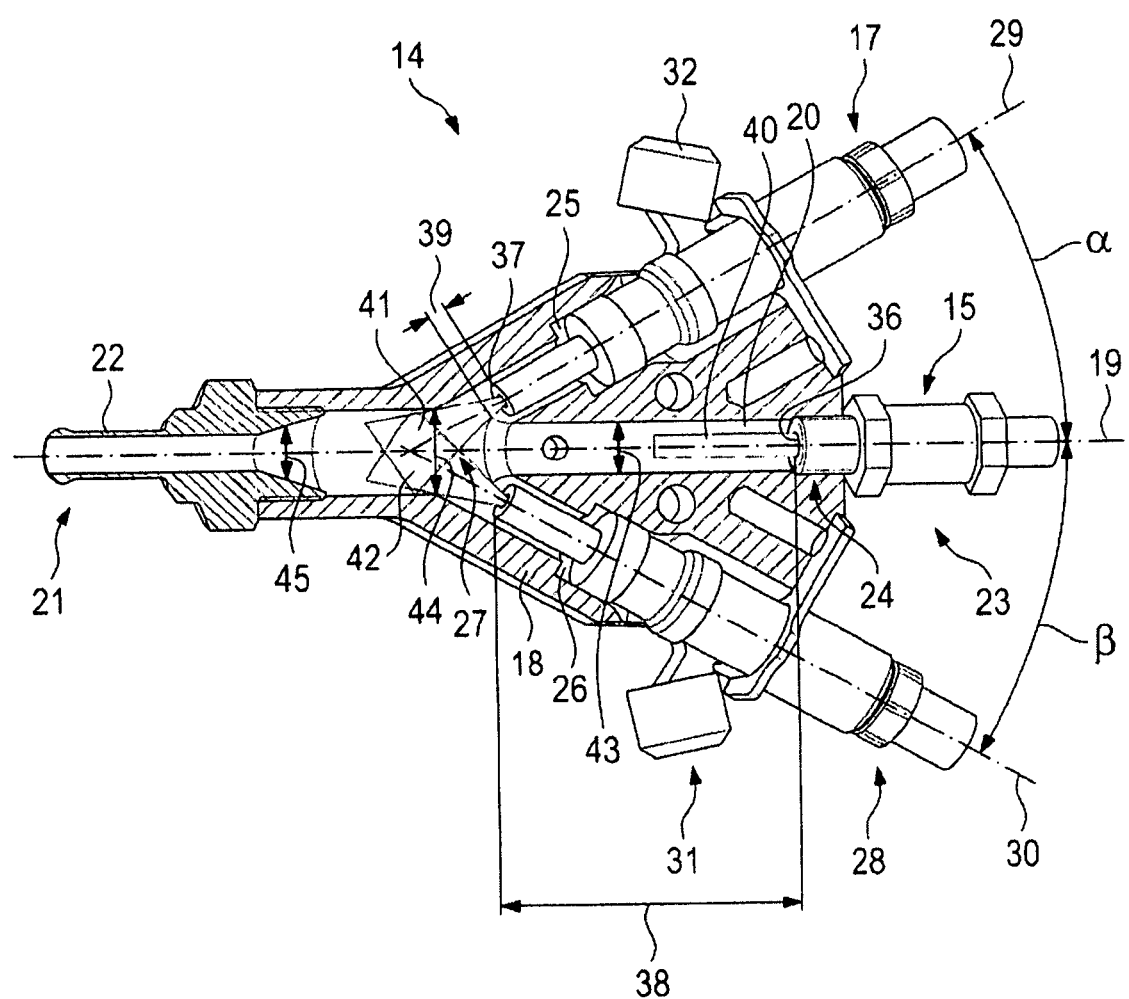
FIG. 3 is a perspective partial section of the mixing device.

The mixing device 14 of the first embodiment is illustrated in FIG. 2 and has two coolant connections 17, 28. The mixing device 14 of the second embodiment is illustrated in FIG. 3 and has three coolant connections 17, 28, 33.

The mixing device 14 comprises a mixer housing 18 with a passage opening 20 extending along its longitudinal axis 19. The passage opening 20 is illustrated as a bore but could be produced in some other manner.

The mixer housing 18 has a first end 21 that faces the cylinder head 6. A nozzle 22 is formed at the first end 21, and the passage opening 20 is open into and coaxial with the nozzle 22. The mixer housing 18 also has a second end 23 that faces away from the first end 21. The second end 23 is designed for immovably receiving the fuel connection 15 so that fuel can flow into the mixer housing 18 coaxially with the passage opening 20. The fuel connection 15, preferably a check valve, is received with the aid of a thread on the mixer housing 18. The passage opening 20 of the mixer housing has a receiving section 24 formed in a manner complementary to the thread for force-fitting and form-fitting connection to the fuel connection 15. An end of the fuel connection 15 that faces the nozzle 22 has an outflow opening 36 via which the fuel can flow from the fuel line 16 into the passage opening 20.

A first receiving opening 25 and a second receiving opening 26 are formed in the mixer housing 18 and open into the passage opening 20. An opening-in point 27 is formed upstream of the nozzle 22. The opening-in point 27 is of chamber-like form due to the opening of the receiving openings 25, 26 into the passage opening 20.

The first coolant connection 17 is received into the first receiving opening 25, and the second coolant connection 28 is received into the second receiving opening 26, so as to be immovable. The two coolant connections 17, 28 are designed for throughflow by water, but could be designed for throughflow by other coolants.

The first receiving opening 25 has a first opening longitudinal axis 29 that is arranged at an acute first angle $\alpha$ to the longitudinal axis 19 in the flow direction of the coolant, thus as viewed in the direction of the opening-in point 27 from the first coolant connection 17. The second receiving opening 26 has a second opening longitudinal axis 30 that is formed at an acute second angle $\beta$ to the longitudinal axis 19, with the second angle $\beta$ corresponding to the first angle $\alpha$ in this embodiment. The angles $\alpha$, $\beta$ do not need to be identical but, for realizing a preferred mixture of the fuel and the coolant, the angle $\alpha$, $\beta$ should be in the form of an acute angle, preferably having a value of 45°, in particular preferably 15-30°.

The coolant connections 17, 28 have at their connection ends 31 formed so as to face the opening-in point 27 further injectors 32, which are provided for atomizing the coolant. Furthermore, the further injectors 32 are designed for opening and closing their throughflow openings (not illustrated in more detail), via which the coolant, proceeding from the coolant connection 17; 28, can flow into the opening-in point 27. The injectors are designed for electronic regulation. It is thereby possible, in a manner dependent on an electronic pulse, for the throughflow opening to be closed or opened, and for the coolant to be injected independently of the fuel.

The injector ends 37 of the further injectors 32 are arranged to face the nozzle 22. Thus, both a fuel jet 40 of the fuel and a coolant jet 41 of the coolant, in terms of their flow direction, are formed to be partially aligned in the same direction before a collision at the opening-in point 27. What is to be understood in this context is not co-axial orientation but rather a flow direction that is at least partially oriented in the direction of the nozzle 22. In this regard, the fuel has a flow direction that is formed to be coaxial with the nozzle 22. The coolant has a flow direction component in the direction of the nozzle 22—and thus coaxial with the nozzle 22—and a flow component perpendicular to the longitudinal axis 19. The longitudinal axis 19 is coaxial with the nozzle 22.

A first spacing 38 from the outflow opening 36 of the fuel connection 15 to the opening-in point 27 of the receiving openings 25, 26 having the coolant connections 17, 28 is larger than a second spacing from the injector ends 37 to the opening-in point such that the colliding coolant jets 41, before a collision of the fuel jet 40, already are able to form a swirled mixture against which the fuel jet 40 can collide and pass through.

Figure 4:
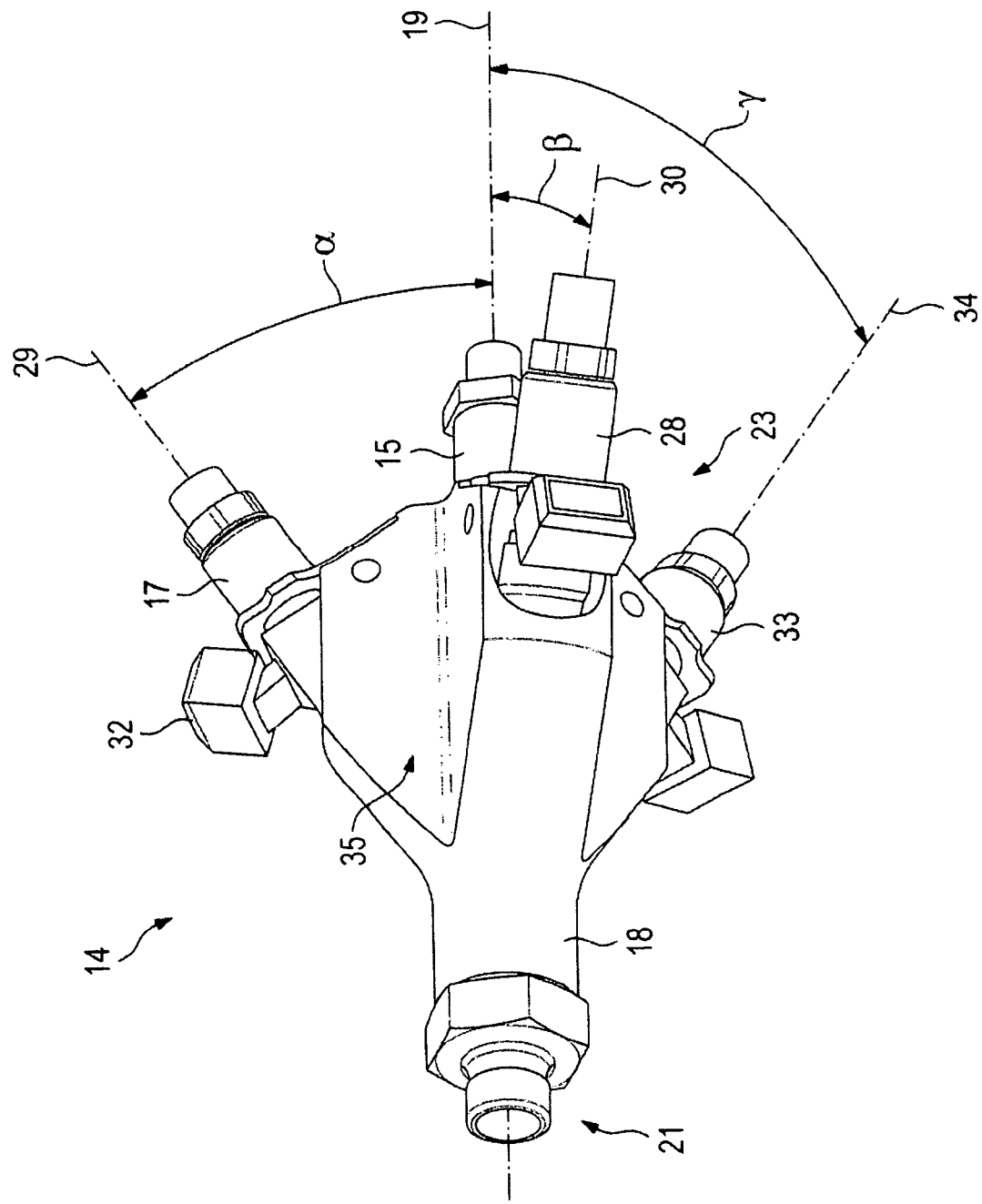
FIG. 4 is a perspective illustration of the mixing device according to a second embodiment.

The mixing device 14 of the second embodiment has a third coolant connection 33, as is illustrated in FIG. 4. The third coolant connection 33 is assigned a third receiving opening (not illustrated in more detail) with a third opening longitudinal axis 34 that is arranged at a third angle γ to the longitudinal axis 19.

Over its periphery, the mixer housing 18 has, in an installation space-optimized manner, cutouts 35 between the coolant connections 17, 28, 33 arranged and distributed symmetrically over its periphery. The cutouts can receive components of the internal combustion engine 3.

The mixing device 14 may optionally be arranged in the high-pressure pump 13. A further arrangement of the mixing device 14 is possible downstream of the high-pressure pump 13 and upstream of the high-pressure line 12. For this purpose, the high-pressure pump 13 is connected to accommodate a flow through to the fuel connection 15, and the nozzle 22 is received in the high-pressure line 12.

For the purpose of realizing efficient mixing of the fuel and the coolant, the fuel is injected at a lower pressure than the coolant is. In this regard, by way of example, in one exemplary embodiment, the fuel is injected at a pressure of 6 bar and the coolant is injected at a pressure of 10 bar. Owing to the higher pressure, the coolant is atomized more finely to achieve improved mixing of the fuel and the coolant.

For improved mixing, a mixing chamber 42, which is formed upstream of the nozzle 22, has a preferred geometry for reducing a flow speed of the fuel. Based on a first cross section 43 of the passage opening 20, at the opening-in point 27, the mixing chamber 42 has a significantly larger second cross section 44. Thus, the flow speed of the fuel is reduced and the coolant jet 41 can, over a large area and in a fine form, undergo collision with the fuel jet 40 and/or upstream of the fuel jet 40 so that particularly good mixing is brought about.

A third cross section 45 of the mixing device 14 is associated with the nozzle 22 and is smaller than the second cross section such that the flow speed of the mixture or of the emulsion can be increased. Thus, it is possible to avoid de-mixing of the fluids upstream of the high-pressure pump. In particular, the third cross section 45 of the nozzle 22 is reduced at least sectionally in the direction of the first end 21 along the longitudinal axis 19. Accordingly, the nozzle 22 may have a conically formed opening whose cross section, the third cross section 45 at the nozzle 22 is of tapering form in the direction of an outlet and facing away from the mixing chamber 42.

The mixing device 14 can be used both for permanent delivery of the fuel and for delivery of the fuel that is regulated on the basis of requirement.

What is claimed is:

1. A device for injecting an emulsion into an internal combustion engine of a motor vehicle, comprising:
   a water tank for storing water;
   a fuel tank for storing fuel;
   first and second fluid lines;
   an emulsion mixer having a mixing chamber, first and second inlets, and an outlet, the water tank being connected to the first inlet via the first fluid line, and the fuel tank being connected to the second inlet via the second fluid line, the emulsion mixer being configured to output an emulsion that comprises the fuel and the water via the outlet;
   a water injector in the first fluid line and separate from the second fluid line; and
   a control unit external of the mixing chamber and configured to control a mixing ratio of the fuel and the water without using any valves external of the mixing chamber and without affecting a delivery of the fuel to the mixing chamber, the control unit sensing a rotation speed of a crankshaft of the internal combustion engine and operating the water injector independently of the fuel to inject intermittent injections of the water into the mixing chamber at an injection frequency and an injection duration in accordance with the sensed rotation speed of the crankshaft of the internal combustion engine, and thereby controlling the mixing ratio.

2. The device of claim 1, wherein the emulsion mixer is configured to mix the fuel with the water in the mixing chamber.

3. The device of claim 1, further comprising a housing, the inlets and the outlet being arranged on the housing, and the mixing chamber being within the housing.

4. A motor vehicle comprising the device of claim 1 and the internal combustion engine, wherein the internal combustion engine is connected to the outlet via a third fluid line.

5. A method for injecting an emulsion into an internal combustion engine of a motor vehicle, comprising:
   providing a fuel line;
   providing a water line with a water injector separate from the fuel line;
   operating the water injector for feeding intermittent injections of water through the water line and into a mixing chamber;
   feeding fuel through the fuel line and into the mixing chamber at a specified fuel feeding rate based at least partly upon a position of an accelerator pedal;
   measuring a crankshaft rotational speed;
   setting a mixture ratio between the water and the fuel using the mixing means by controlling the water injector for adjusting at least one of a frequency and a duration of the intermittent injections of water into the mixing chamber as function of the measured crankshaft rotational speed without using any valves external of the mixing chamber and independently of the specified fuel feeding rate;
   mixing, in the mixing chamber, the emulsion that comprises the water and the fuel in the set mixture ratio; and
   injecting the emulsion into the internal combustion engine.

* * * * *